United States Patent
Preisler et al.

(10) Patent No.: US 6,180,207 B1
(45) Date of Patent: *Jan. 30, 2001

(54) FOIL-COVERED AUTOMATIC INTERIOR PLASTIC PART HAVING A DECORATIVE PREFORM AND METHOD OF MAKING SAME

(75) Inventors: Darius J. Preisler, Macomb; Jason T. Murar, Clinton Township, both of MI (US)

(73) Assignee: Patent Holding Company, Fraser, MI (US)

( * ) Notice: Under 35 U.S.C. 154(b), the term of this patent shall be extended for 0 days.

This patent is subject to a terminal disclaimer.

(21) Appl. No.: 09/228,585

(22) Filed: Jan. 11, 1999

Related U.S. Application Data

(63) Continuation-in-part of application No. 09/144,159, filed on Aug. 31, 1998, now Pat. No. 6,082,762, and a continuation-in-part of application No. 09/144,315, filed on Aug. 31, 1998.

(51) Int. Cl.[7] ................ B32B 3/08; B60R 21/20
(52) U.S. Cl. ............. 428/139; 428/156; 428/458; 428/31; 428/172; 428/207; 428/187; 428/209; 428/35.7; 428/35.9; 428/421; 428/483; 428/412; 428/480; 428/423.7; 428/77; 428/78; 428/79; 280/728.3; 280/731
(58) Field of Search .................. 280/728.3, 731; 428/156, 458, 31, 172, 207, 187, 209, 35.7, 35.9, 421, 483, 412, 480, 423.7, 77, 78, 79, 139

(56) References Cited

U.S. PATENT DOCUMENTS

| | | | |
|---|---|---|---|
| 4,125,655 | * 11/1978 | Kanzelberger | 428/67 |
| 4,292,827 | * 10/1981 | Waugh | 72/46 |
| 4,769,100 | 9/1988 | Short et al. | 156/285 |
| 4,877,657 | * 10/1989 | Yaver | 428/31 |
| 4,902,557 | 2/1990 | Rohrbacher | 428/215 |
| 4,952,351 | 8/1990 | Parker et al. | 264/46.4 |
| 5,466,412 | 11/1995 | Parker et al. | 264/255 |
| 5,487,557 | 1/1996 | Eckhout | 280/780.3 |
| 5,529,336 | 6/1996 | Eckhout | 280/780.3 |
| 5,674,580 | * 10/1997 | Boswell | 428/40.9 |
| 5,678,851 | 10/1997 | Saito et al. | 280/780.3 |
| 5,731,064 | * 3/1998 | Suss | 428/195 |
| 5,769,548 | 6/1998 | Thompson et al. | 400/208 |

FOREIGN PATENT DOCUMENTS

| | | | |
|---|---|---|---|
| 6091758 | * | 4/1994 | (JP). |
| 7205536 | * | 8/1995 | (JP). |

* cited by examiner

Primary Examiner—William P. Watkins, III
(74) Attorney, Agent, or Firm—Brooks & Kushman P.C.

(57) ABSTRACT

A foil-covered automotive interior plastic part including a decorative preform is provided including a hot stamping foil having a foil top layer disposed on a plastic bottom layer which, in turn, is bonded to a outer surface of a plastic structural substrate at foil-receiving portions of the outer surface. A hot stamping machine is operated for a time sufficient to generate a pressure and temperature sufficient to melt and combine the top surface of the foil-receiving portions and the plastic bottom layer of the hot stamping foil to form the foil-covered plastic part. The at least one foil-receiving portion includes a plurality of raised design portions having top and side surfaces. The foil layer completely covers the top surfaces but only the side surfaces of the raised design portions which extend above a front surface of the preform. Preferably, the raised design portions represent screw heads. The decorative preform is bonded to the outer surface of the plastic structural substrate which may be a plastic front panel of an automotive air bag cover adapted to enclose an uninflated automotive air bag.

9 Claims, 3 Drawing Sheets

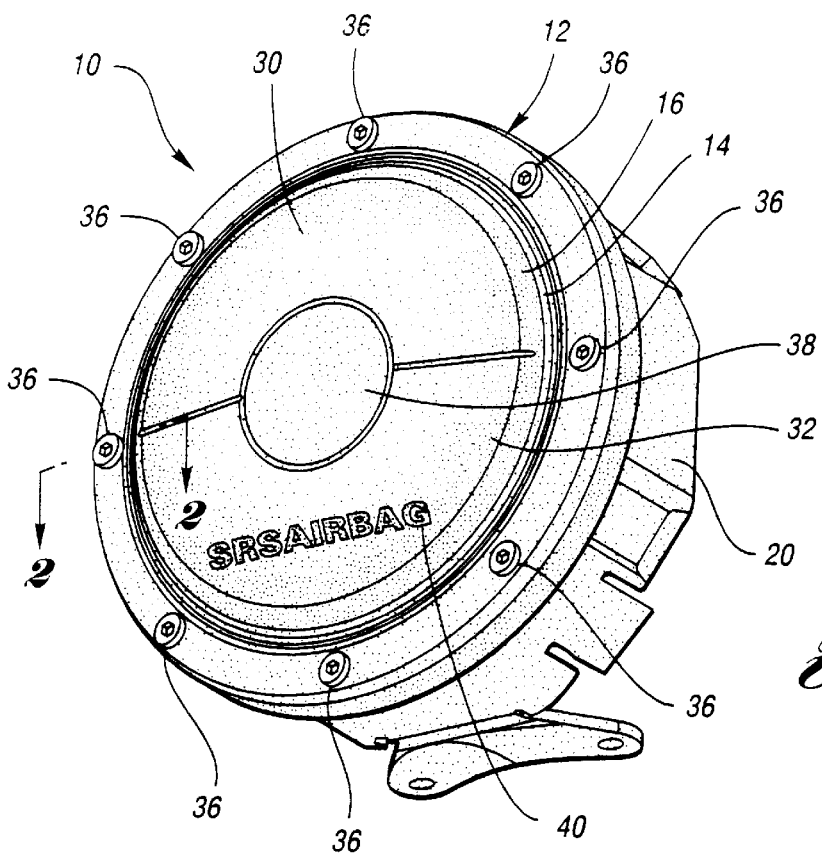
Fig. 1
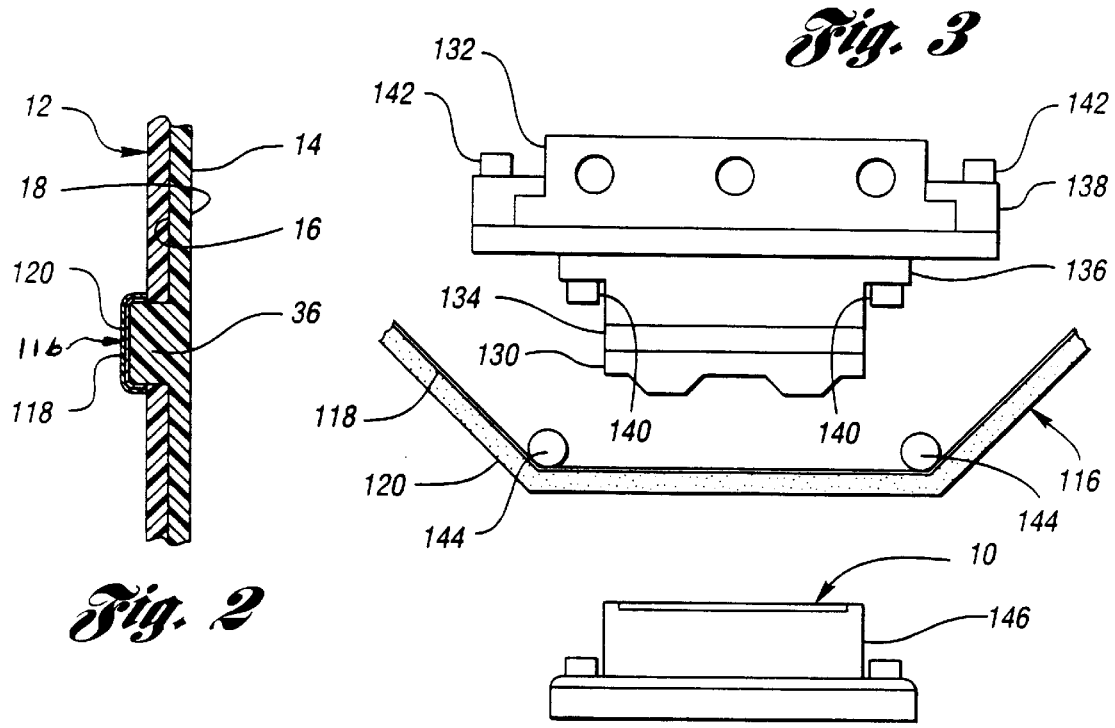
Fig. 2
Fig. 3

FOIL-COVERED AUTOMATIC INTERIOR PLASTIC PART HAVING A DECORATIVE PREFORM AND METHOD OF MAKING SAME

CROSS-REFERENCE TO RELATED APPLICATIONS

This application is a continuation-in-part of U.S. patent application Ser. No. 09/144,159, filed Aug. 31, 1998, now U.S. Pat. No. 6,082,762 entitled "Air Bag Cover Having A Decorative Applique Preform Bonded Thereto And Method Of Making Same" and U.S. Ser. No. 09/144,315, also filed Aug. 31, 1998, entitled "Foil-Covered Plastic Part And Method Of Making Same".

TECHNICAL FIELD

This invention relates to foil-covered plastic parts and method of making such parts and, in particular, to foil-covered automotive interior plastic parts having a decorative preform and methods of making such automotive interior plastic parts utilizing a hot stamping machine.

BACKGROUND ART

Typically, automotive interior plastic parts are painted after they are molded. The painting process requires elaborate facilities and consequently necessitates large expenses. For instance, significant square footage of a factory must be dedicated to a clean room environment for the spraying of paint and clear coat and for the baking and curing of paint on components, such as those components used in the automotive industry, such as body panels, air bag covers, instrument panels and the like. Moreover, solvent-based paints have in recent years raised significant environmental concerns because of the volatile organic components which are emitted into the air during the application of such solvent-based paints. As a result, the evaporation of such solvents must be strictly monitored to satisfy environmental and safety regulations.

In addition, automotive components, especially interior automotive components, are strictly scrutinized following the painting process in order to match or conform the automotive component to the styling and aesthetic requirements of the associated interior trim product. Painting such automotive components following the molding process, raises quality concerns with respect to the color, consistency, and thickness of each individual paint application.

U.S. Pat. No. 5,678,851 to Saito et al. discloses an air bag module cover including an ornament on a cover member. The ornament may be made from a resin material with a metal foil.

U.S. Pat. No. 4,902,557, the Rohrbacher reference discloses a method and apparatus for manufacturing a thermoplastic polyolefin composite useful as an exterior auto or truck body part.

U.S. Pat. No. 4,769,100, the Short reference, teaches a method of applying a carrier film pre-printed with metallic paint to an automobile body panel in a vacuum forming process.

U.S. Pat. No. 4,952,351 and U.S. Pat. No. 5,466,412, the Parker patents, teach a method of manufacturing an air bag cover for an inflatable air bag system including a bondable film carrier, which is painted after the film carrier is molded.

Hot stamping is utilized for plastic decorating. For example, U.S. Pat. No. 5,769,548 discloses a hot stamp imprinting system with latchable ink ribbon cassette and handle.

Presently, when air bag covers are provided in automobiles on the driver's side of the vehicle, the air bag is stored in the steering column behind an air bag cover. During automatic inflation of the air bag, the air bag cover moves away from the steering column to permit its safety function between the steering column and the operator of the vehicle.

Recent practice in the automotive industry is utilization of all plastic fabricated air bag covers. It is known in other automotive parts areas that different, aesthetically pleasing outer surfaces enhance the overall appearance of the interior of automotive vehicles. Use of decorative appliques having solid colors contrasting or blending with the different colors of the plastic air bag covers is often sought after. Simulated wood grain finishes, and metallic finishes are also popular and economically feasible in combination with various plastic automotive parts.

Difficulties are known to arise in properly applying applique films to annular or arcuate plastic outer surfaces. Applique films are usually approximately 0.5 millimeters thick or less and are therefore not easily applied directly to an outer air bag cover surface. Improper application causes small air pockets to occur on the decorative film which often makes the resultant air bag cover, unattractive and thus unusable. Additionally, conventional air bag covers invariably include annular or arcuate surfaces, and affixing the thin applique film to these designated surfaces is even more difficult.

The deposition or fastening of the applique must be perfected with a method that affords a smooth surface and neat appearance. Thus it is known to utilize a backing material or liner in conjunction with a thin applique film to afford a clean, smooth appearance of the final product.

In addition, the applique must be affixed to the front cover in such a way as to prevent the applique from separating from the front cover when the air bag deploys. The applique must therefore be bonded to the front cover with sufficient strength to prevent fragmentation of the applique during air bag inflation and exit.

The U.S. patents to Eckout 5,487,557 and 5,529,336 disclose an automotive air bag cover having a decorative applique fastened thereto. The air bag cover is manufactured from plastic and includes a front panel adapted to enclose an uninflated automotive air bag. The front panel includes inner and outer surfaces. Side panels are further provided and are connected to and extend from the front panel. The decorative applique is fastened to the outer surface of the front cover by a plurality of connecting towers which extend through the front cover. Seams are provided for permitting the air bag to inflate and exit the front cover. The decorative applique is fastened to the front cover adjacent the seams in a non-overlapping fashion such that the decorative applique does not interfere with exit or inflation of the air bag.

However, the prior art fails to provide a foil-covered automotive interior plastic part having a decorative preform and method of making same wherein hot stamping is used and wherein the foil is bonded to a substrate of the plastic part so as to have the durability and strength necessary to support varying applications yet comply with styling and aesthetic requirements.

DISCLOSURE OF INVENTION

An object of the present invention is to provide a foil-covered automotive interior plastic part and method of making same wherein a decorative preform in combination with at least one foiled decorative feature formed on an outer surface of a plastic structural substance of the plastic part present an aesthetically pleasing appearance.

In carrying out the above object and other objects of the present invention, a foil-covered automotive interior plastic part is provided. The foil-covered plastic part includes a plastic structural substrate including at least one foil-receiving portion formed on an outer surface thereof and a decorative preform bonded to the outer surface in non-overlapping fashion with respect to the at least one foil-receiving portion. The foil-covered plastic part also includes a hot stamping foil having a foil top layer disposed on a plastic bottom layer which, in turn, is bonded to an outer surface of the at least one foil-receiving portion to form the automotive interior foil-covered plastic part. The resulting part has an aesthetically pleasing appearance.

The at least one foil-receiving portion may include a plurality of raised design portions having top and side surfaces.

The decorative preform may include a plurality of apertures extending between front and rear surfaces of the preform at predetermined spaced locations. The raised design portions extend through the corresponding apertures. The foil layer completely covers the top surfaces and the side surfaces of the raised design portions which extend above the front surfaces of the preform.

The raised design portions may represent screw heads.

The decorative preform preferably comprises a plastic film sheet compatible with the plastic of the substrate so that diffusion occurs between the plastic film sheet and the outer surface of the substrate. The plastic film sheet is shaped correspondingly to the outer surface of the substrate.

The plastic layer of the hot stamping foil is preferably compatible with the at least one foil-receiving portion so that diffusion occurs therebetween.

In one embodiment, the foil layer is a chrome layer.

In the embodiment shown, the substrate is a plastic front panel of an automotive air bag cover adapted to enclose an uninflated automotive air bag.

Still further in carrying out the above object and other objects of the present invention, a method is provided for making the foil-covered automotive interior plastic part. The method includes providing a film sheet, vacuum molding the film sheet in a mold cavity to obtain a decorative preform having plastic top and bottom surfaces, and placing the decorative preform in a mold cavity of an injection mold having a shape defining the part. The method also includes injecting a thermoplastic elastomer into the mold cavity of the injection mold to generate a substrate of the part wherein the generation of the substrate of the part creates sufficient pressure and heat to bond the substrate to the bottom surface of the decorative preform and to form at least one foil-receiving portion at a top surface of the substrate which does not overlap with the preform. The method also includes the steps of providing a hot stamping foil having a foil top layer disposed on a plastic bottom layer, aligning the hot stamping foil with the at least one foil-receiving portion in a hot stamping machine, and operating the hot stamping machine for a time sufficient to generate a temperature and a pressure sufficient to melt and combine a top surface of the at least one foil-receiving portion and the plastic bottom layer of the hot stamping foil to form the foil-covered automotive interior plastic part.

Important advantages of hot stamping are:

Dry Decorating Method—A hot stamped part is immediately ready for handling and packaging.

Variety of Materials—A variety of materials can be decorated using the hot stamping process. The most commonly decorated material is thermoplastics, but thermosets as well as wood, book cloth, leather, textiles, paper, cardboard and pre-painted metals are stamped with great success.

Variety of Decorating Finishes—Hot stamping is a decorative method where permanent gold and silver metallic graphics can be produced. Foils are also manufactured in gloss or matte pigment colors, wood grain designs, brushed effects, and chromium for exterior use. Multi-colored graphics can also be accomplished with pre-printed heat transfers and continuous patterned foils.

Variety of Surface Geometries—Hot stamp foils can be applied to a variety of surface geometries including flat, cylindrical and spherical shaped parts along with raised beads graphics.

Minimum Set-Up Time—To change the stamping color simply involves changing a dry roll of hot stamp foil.

Permanent Decoration—Hot stamping foil has excellent adhesion and abrasion resistance due to thermal bonding that takes place.

EPA or Fire Safety Considerations—With hot stamping, there are no EPA or fire safety considerations to be concerned about. Hot stamping, unlike other decorating methods, does not require any special storage, insurance or removal of hazardous solvents or vapors.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a front perspective view of a foil-covered automotive interior plastic part such as an air bag cover having a decorative preform or applique constructed in accordance with the method of the present invention;

FIG. 2 is a sectional view, partially broken away, taken along lines 2—2 in FIG. 1 to illustrate the various layers of the foil-covered automotive interior plastic part;

FIG. 3 is a side schematic view of a hot stamping machine in a vertical stamping set up;

BEST MODE FOR CARRYING OUT THE INVENTION

Figure 4A:
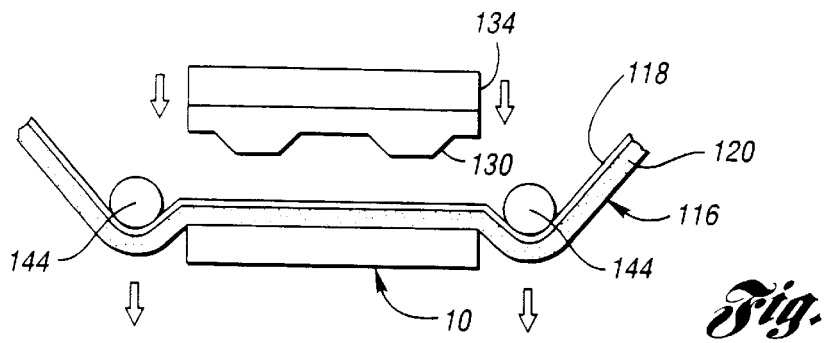
FIGS. 4a, 4b, 4c, 4d, 4e are side schematic views illustrating the various steps taken by the hot stamping machine of FIG. 3 in order to cover portions of a plastic part with foil.

Referring now to the drawing figures, and in particular to FIG. 1, an automotive interior air bag cover constructed in accordance with the present invention is generally shown at 10. The cover 10 includes a decorative applique preform, generally indicated at 12, bonded to a front panel 14 of the cover 10. The front panel 14 has an arcuate outer surface 16 and an inner surface 18 (i.e. FIG. 2). Side panels 20 extend rearwardly from the front panel 14.

A thermoplastic elastomer of the cover 10 is preferably a thermoplastic elastomer such as a thermoplastic polyolefin, thermoplastic urethane, polyester, polycarbonate, a mixture of polycarbonate and ABS (acrylonitrilelbutadiene/styrene) or similar material. The air bag cover 10 may be manufactured from a flexible thermoplastic material such as commercially available "Santoprene" 201-87 provided by Advanced Elastomers Systems of Auburn Hills, Mich.

A continuous tear seam (not shown) extends around the perimeter of the inner surface 18 and across the inner surface 18 of the air bag cover 10. An uninflated air bag (not shown) is located directly adjacent the inner surface 18. The air bag cover 10 is designed to enclose the uninflated air bag and is usually positioned upon the steering wheel (not shown) of the automotive vehicle.

The decorative applique preform 12 may be a contemporary decorative applique having wood grain simulations, a chromed or silvered surface or a textured surface. The decorative applique preform 12 is a thin membrane composite having a thickness of less than 0.5 millimeters.

The preform 12 preferably includes a film sheet that is pre-painted. The film sheet is preferably a polyester sheet such as Mylar®, a polyurethane or polycarbonate sheet. The corresponding film layer is preferably compatible with the plastic of the front panel 14 so that diffusion between contact surfaces occurs in the method of the present invention as described hereinbelow.

The preform 12 preferably includes the film sheet with the following coatings placed thereon, a layer of acrylic color in mating contact with the film sheet and a layer of polyvinylidine fluoride (PVDF) with an acrylic clear coat to protect the film from damage and to provide film elasticity, chemical resistance, stain resistance, weathering and UV protection. In the most preferred embodiment, PVDF comprises 72% of the total preform thickness which is 0.2 mils.

The durometer and elastic or flex modulus of the cover 10 may vary depending on the desired stiffness of the component. Typically, the durometer of the front panel 14 will be in the range of about 20 Shore D to 100 Shore D, while the flexural modulus will be in the range of about 15,000 to about 400,000 psi. Also, typically, the durometer of the preform 12 will be in the range of about 15 Shore A to 100 Shore A. These ranges of course vary depending on the desired plastic component to be manufactured and are only illustrative of one example.

The features of the preform components or layers are 1) a stiff inner material to support the intended application; 2) reduction and/or elimination of paint problems such as drips, runs, spits, dry spray, light coverage and gloss and improved color match and paint adhesion; 3) reduced molding scrap due to splay, flow marks and minor surface imperfections, which can be completely covered; and 4) increased durability of the resulting plastic laminate components.

Referring again to FIGS. 1 and 2, the decorative applique preform 12 is shown bonded to the air bag cover 10. The decorative applique preform 12 is disposes adjacent the tear seam in a non-overlapping fashion to prevent any interference of preform 12 with inflation or exit of the air bag upon operation. The decorative applique preform 12 is therefore located sufficiently away from the seam such that the attendant explosive effect that occurs upon inflation and exit of the air bag will move separable front flap portions 30 and 32 away from the decorative applique preform 12. The flap portions 30 and 32 act as live hinges when air bag inflation and exit occurs.

It is known that decorative appliques enhance the appearance of conventional automotive parts. Air bag covers are currently designed to accommodate the overall appearance of the inside of the particular automobile. In furtherance of improving the aesthetic appeal of air bag covers, the present invention combines the pleasing visual characteristics of decorative appliques with the pleasing visual characteristics of foil-covered portions of a plastic structural substrate in the form of the front panel 14 together with the functional aspects of the air bag cover 10. FIG. 1 illustrates the air bag cover 10 having the preform 12 with a brushed metal or "rich" (painted, glossy) look with raised design portions in the form of matt black screw heads 36. The screw heads 36 form an integral part of the front panel 14 since holes are formed in the preform 12 prior to the step of injecting the plastic of the front panel 14 as noted below.

The air bag cover 10 provides a decorative appearance by the addition of the decorative applique preform 12 as well as the foil-covered screw heads 36 without effecting the operable conditions of the air bag cover 10. The decorative applique preform 12 is bonded to the air bag cover 10 with sufficient strength and at a location such that neither the preform 12 nor the foil-covered screw heads 36 affect the inflation and subsequent exit of the inflating air bag from the cover 10.

The front panel 14 also includes a recessed area 38 for a logo and recessed graphical indicia 40. As also shown in FIG. 2, a hot stamping foil, generally indicated at 116, includes a foil top layer 118 disposed on a plastic bottom layer 120. The plastic bottom layer 120, which may be a polyester film layer, is bonded to the raised decorative portions 36 (i.e. the screw heads) on the plastic outer surface of the front panel 14. In other words, the plastic bottom layer 120 bonds with raised surface portions 36 of the front panel 14 at top and bottom surfaces of the portions which extend above a front surface of the preform 12.

Referring now to FIG. 3, there are illustrated parts of a hot stamping machine for use in foiling the plastic part 10 of the present invention.

In the thermoplastic foil, vertical stamping arrangement illustrated in FIG. 3, a silicone rubber die 130 is mounted to an aluminum backing plate 134 which, in turn, is mounted to a die mounting block 136 which, in turn, is mounted to a die mounting plate 138 by means of bolts 140 which, in turn, is mounted to a heater head by bolts 142.

The silicone die 130 consists of heat stable silicon rubber available in a wide range of hardness (durometer) bonded to the aluminum packing plate 134. Recessed portion of the die 130 which correspond to the design portions or screw heads 36 illustrated in FIG. 1 which are to be stamped are formed on the die surface a minimum distance of $\frac{1}{32}$" and are heated to a temperature near the melting point of the plastic layer 120, usually in excess of 300° F. Centered directly below the silicone die 130 in a path defined by two stripper bars 144 is the hot stamp foil 116 consisting of one or more thin coatings such as the plastic bottom layer 120 deposited on a film carrier in the form of the foil top layer 118. Typically, there is approximately ½ inch space between the foil top layer 118 and the hot die face of the silicone die 130 so that the release characteristics of the hot stamping foil 116 and the hot die face of the silicone die 130 are affected as little as possible by heating convection.

Supported directly below the silicone die 130 and the hot stamping foil 116 is aligned a part holding fixture 146 which supports the air bag cover 10 so that the raised design portions (i.e., the screw heads 36) formed thereon are aligned within ¼ to $\frac{1}{10}$ of a millimeter with the indentations of the heads formed on the face of the silicone die 130.

Referring now to FIGS. 4a–4e, there are illustrated the various steps taken in the hot stamping machine to make the foil-covered plastic part 10.

With particular reference to FIG. 4a, when the machine sequence has been initiated, the silicone die 130 and its aluminum backing plate 134 are moved toward the foil-receiving surface of the design portions 36 to be decorated. The foil 116 travels with the die 130 and, at the same time, maintains its distance from the die face. The foil 116 contacts the part 10 first and the stripper bars 144 act to push the foil 116 tightly over the surfaces of the raised design portions (i.e. the screw heads 36) to remove any wrinkles.

Figure 4B:
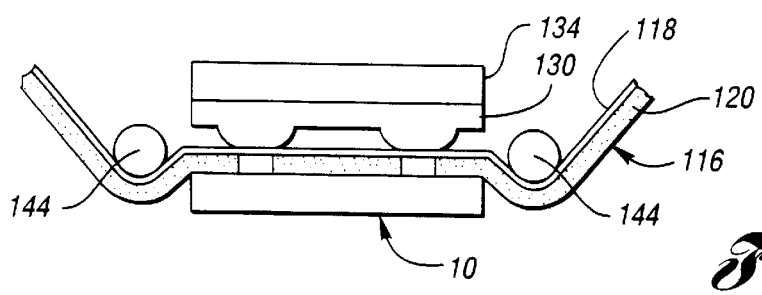

Referring now specifically to FIG. 4b, a fraction of a second after the foil 116 is pushed over the part 10, the hot stamp die surface of the die 130 makes contact simultaneously with the foil 116 and the rigidly supported plastic part 10. The pressure that is exerted accomplishes two things. First, the silicone rubber of the die 130 compresses and conforms to any small surface variation in the part decorating area (i.e., the decorative surface portions or screw heads 36) so that even contact is achieved. Second, the foil resins together with the corresponding portions of the foil top layer 118 in the graphic area will break cleanly creating a parting line.

Figure 4C:
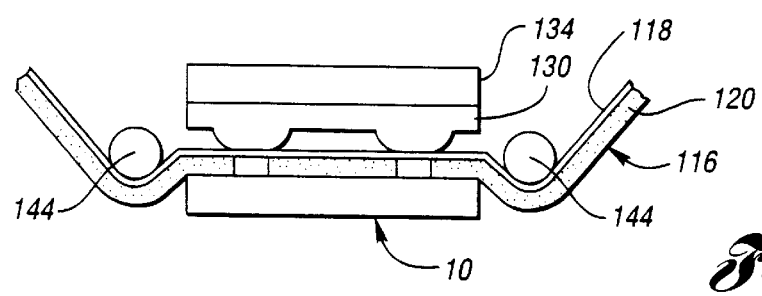

Referring now specifically to FIG. 4c, during the dwell time illustrated in FIG. 4c, the period that the hot die 130 is in contact with the foil 116 and the part 10, heat conduction causes the release agents and resins of the foil 116 to soften. At the same time, the top layers of the design portions 36 of the front panel 14 begins to soften and the pressure exerted by the hot stamping machine helps the resins of the plastic bottom layer 120 penetrate the molten plastic of the top layers of the design portions 36 to promote thermal bonding.

Figure 4D:
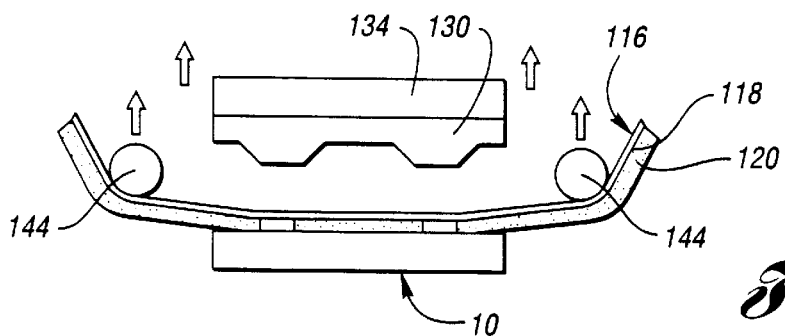

Referring specifically now to FIG. 4d, at the end of the dwell time, the head of the machine, including the silicone die 130 and aluminum backing plate 134, retracts and begins its ascent to its start position. First, the die 130 moves away from the part 10 while the foil 116 remains on the surface for a split second, allowing the foil 116 to cool and plasticize. Then as the die 130 continues to rise, portions of the foil 116 over the raised design portions 36 are peeled away from the rest of the foil 116. At this point, adhesion between the design portions 36 of the part 10 and the portions of the foil coatings is greater than the bond between the release agents in the coatings and the rest of the foil 116 resulting in virtual complete deposition of the foil coatings over the screw heads 36.

Figure 4E:
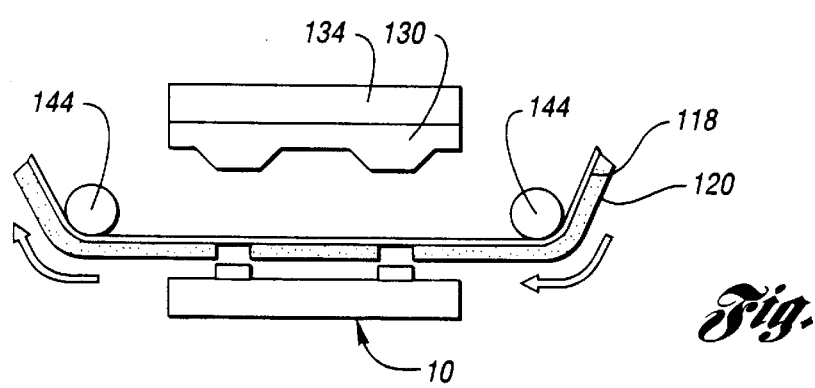

Referring now to FIG. 4e, as soon as the head of the machine, including the die 130, returns to its original position, the foil 116 will advance and an unused section will be positioned under the die 130. Finally, the hot stamped part 10 can be removed from the fixture 146 and handled or packaged as necessary without any danger of rubbing the foil off the decorative portions 36 of the front panel 14.

Figure 5:
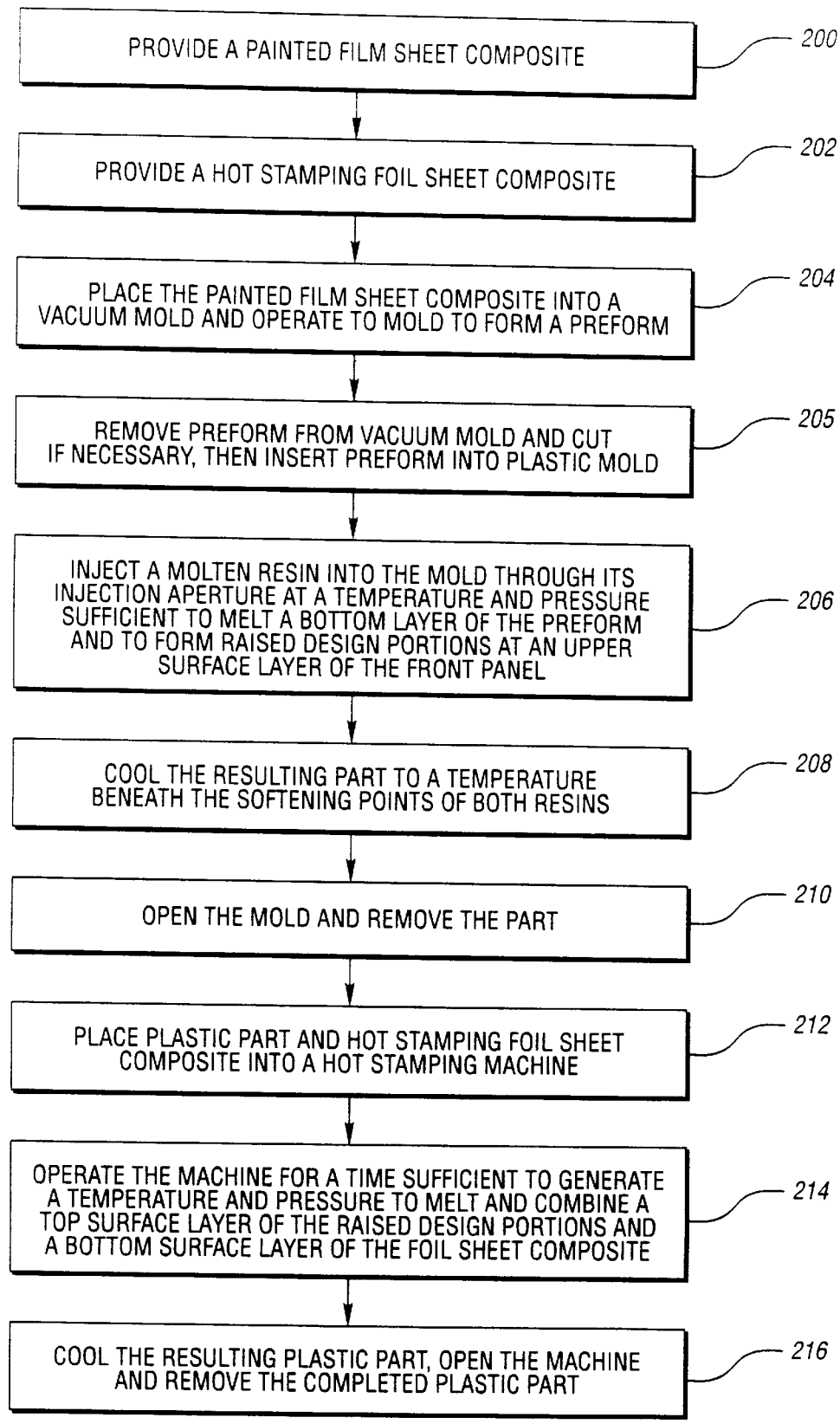
FIG. 5 is a block diagram flow chart illustrating the various method steps in forming the foil-covered automotive interior plastic part constructed in accordance with the present invention.

Referring now to FIG. 5, there is illustrated in block diagram flow chart form the various method steps for making the foil-covered plastic part 10 of the present invention.

At block 200, a painted film sheet composite is provided as described above.

At block 202, a hot stamping foil sheet composite 116 is also provided.

At block 204, the painted film sheet composite is placed into a vacuum mold and the vacuum mold is operated to form the preform 12.

At block 205, the preform 12 is removed from the vacuum mold and is cut to form apertures therethrough if necessary. Then, the preform 12 is inserted into a plastic mold.

At block 206, molten resin is injected into the plastic mold through its injection aperture at a temperature and pressure sufficient to melt a bottom surface layer of the preform 12 and to form raised design portions (i.e., the screw heads 36) at an upper surface layer of the resulting front panel 14 of the air bag cover 10.

At block 208, the part is cooled to a temperature beneath the softening point of both resins.

At block 210, the mold is opened and the part is removed.

At block 212, the plastic part including the preform 12 are placed or aligned in the hot stamping machine, illustrated in FIG. 4.

At block 214, the hot stamping machine is operated as indicated in FIGS. 4a–4e for a time sufficient to generate a temperature and pressure to melt the combined top surface layer of the raised design portions (i.e., the screw heads 36) and the bottom surface layer 120 of the foil sheet composite 116. The screw headshaped top layer portions are removed from the foil sheet 116 and bonded to the raised design portions 36 on the front panel 14.

At block 216, the resulting plastic part is cooled and the hot stamping machine is opened by raising the die 130 and the completed plastic part 10 is removed from the machine.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A foil-covered automotive interior plastic part comprising:
    a plastic structural substrate including at least one foil-receiving portion formed on an outer surface thereof;
    a decorative preform bonded to the outer surface of the substrate wherein the decorative preform includes at least one aperture extending between front and rear surfaces of the preform and wherein the at least one foil-receiving portion of the substrate extends completely through the at least one aperture and which has top and side surfaces; and
    a hot stamping foil having a foil top layer disposed on a plastic bottom layer which is bonded to an outer surface of the at least one foil-receiving portion and wherein the foil layer covers the top and side surfaces of the at least one foil-receiving portion which extends above the front surface of the preform to form the foil-covered automotive interior plastic part which has an aesthetically pleasing appearance.

2. The part as claimed in claim 1 wherein the decorative preform includes a plurality of apertures extending between front and rear surfaces of the preform at predetermined spaced locations and wherein the at least one foil-receiving portion includes a plurality of raised design portions which extend through the corresponding apertures and which have top and side surfaces and wherein the foil layer completely covers the top surfaces and the side surfaces of the raised design portions which extend above the front surface of the preform.

3. The part as claimed in claim 2 wherein the raised design portions represent screw heads.

4. The part as claimed in claim 1 wherein the decorative preform comprises a plastic film sheet compatible with the plastic of the substrate so that diffusion occurs between the plastic film sheet and the outer surface of the substrate, the plastic film sheet being shaped correspondingly to the outer surface of the substrate.

5. The part as claimed in claim 1 wherein plastic layer of the hot stamping foil is compatible with the at least one foil-receiving portion so that diffusion occurs therebetween.

6. The part as claimed in claim 1 wherein the foil layer is a chrome layer.

7. The part as claimed in claim 1 wherein the substrate is a plastic front panel of an automotive air bag cover adapted to enclose an uninflated automotive air bag.

8. The part as claimed in claim 1 wherein the at least one foil-receiving portion includes a plurality of raised design portions.

9. The part as claimed in claim 8 wherein the raised design portions represent screw heads.

\* \* \* \* \*